Sept. 16, 1969  S. M. DOCKERTY  3,467,513
PROCESS AND APPARATUS FOR HIGH PRESSURE EXTRUSION OF GLASS
Filed Oct. 20, 1965  2 Sheets-Sheet 1
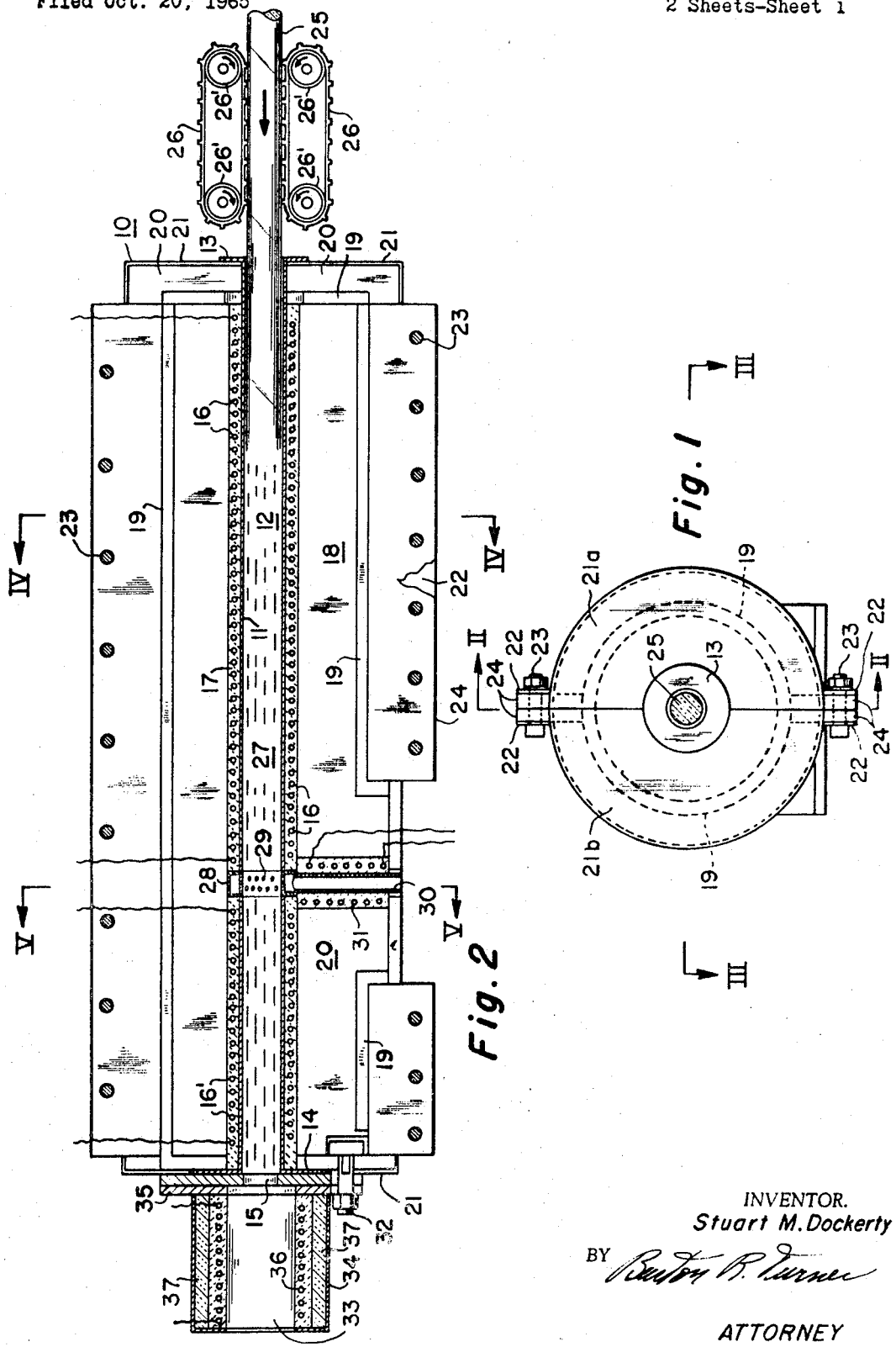
INVENTOR.
Stuart M. Dockerty
BY
ATTORNEY

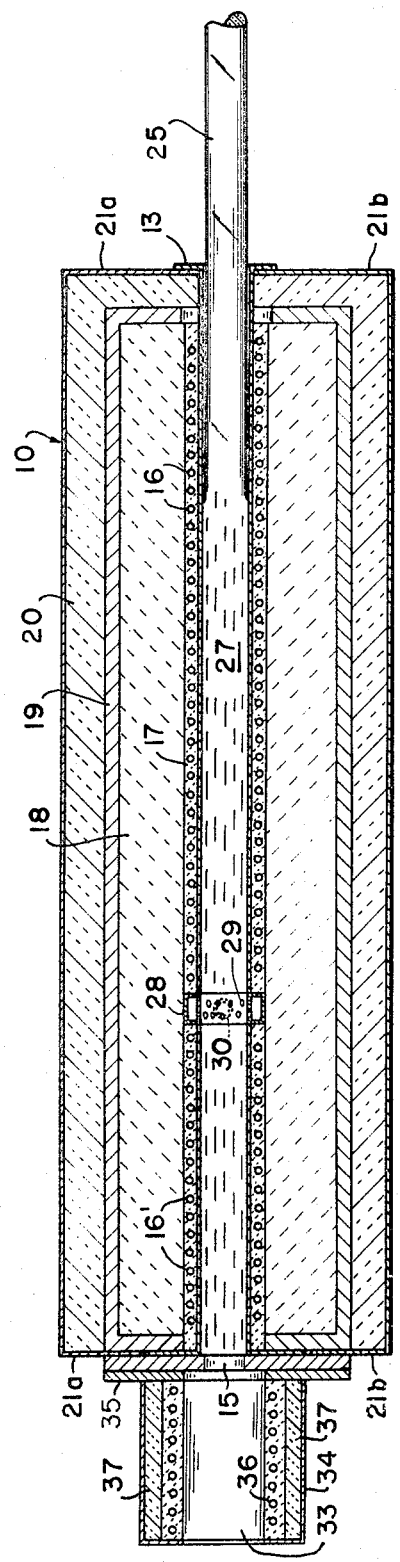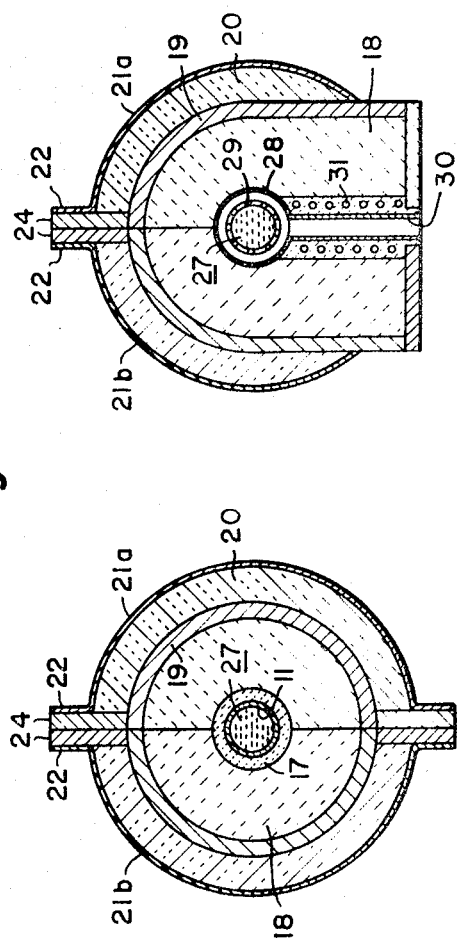

United States Patent Office 3,467,513
Patented Sept. 16, 1969

3,467,513
**PROCESS AND APPARATUS FOR HIGH
PRESSURE EXTRUSION OF GLASS**
Stuart M. Dockerty, Corning, N.Y., assignor to Corning
Glass Works, Corning, N.Y., a corporation of New
York
Filed Oct. 20, 1965, Ser. No. 498,436
Int. Cl. C03b 37/08
U.S. Cl. 65—183                                          8 Claims

ABSTRACT OF THE DISCLOSURE

Molten glass of relatively high viscosity is forced through intricately shaped orifices at high pressures in order to extrude shaped glass articles with little or no attenuation.

---

In the normal cane or tube drawing processes, the flow of the molten glass is roughly proportional to the square of the orifice area times the glass head, divided by the glass viscosity. Since the glass head is conventionally fixed by the bowl depth above the delivery orifice at about 2 feet, or equivalent to about 2 p.s.i., it is necessary that the orifice area be many times greater than that of the desired finished glass cross-sectional area in order to obtain appreciable flow rates. However, at low viscosity and high attenuation, the glass tends to form a circular shape regardless of the orifice contour, thus preventing the formation of structural shapes other than round.

The low flow rates which are produced with the normal existing heads of molten glass require large attenuation rates in order to produce a product at commercial flow rates. The necessary attenuation produces dimensional variations which are proportionate to the square root of the attenuation ratio, which is the ratio of the initial cross-sectional area of the glass at the orifice to the final cross-sectional area of the product as set up. As previously mentioned, this attenuation not only produces variations in cross-sectional dimensions, but also tends to result in a rounded cross-sectional configuration irrespective of the orifice configuration.

Although the generic idea of forcing molten glass through an orifice is well known in the art, the present invention sets forth a new concept in accomplishing dimensional uniformity in a finished product having a desired cross-sectional configuration by virtually eliminating attenuation. Strip or rod stock is utilized as a plunger for generating the high pressure required to extrude the viscous molten glass at the orifice. Unlike known systems, the present concept does not utilize air to produce high pressure, and accordingly the melting furnace or cylinder is relatively safe or explosion-proof. Further, since there is no pressurized air introduced into the melting chamber of the furnace which could become entrapped in the molten glass, the resulting glass is necessarily of high quality. In addition, a small portion of the surface glass adjacent the walls of the melting chamber may be skimmed off, if the glass compositions so warrant, to remove any blisters or seeds formed on the surface thereof. It is thus possible with the present invention to melt the introduced stock and directly form a finished high quality glass product therefrom without necessitating further fining of the molten glass, since sources of contamination and air inclusion are virtually nonexistent.

An object of the present invention has been to provide method and apparatus for forming extruded glass products with little or no attenuation.

A further object of the invention has been to provide a method and apparatus for producing glass articles from relatively high viscosity glass at reasonable flow rates.

An additional object of the invention has been to continuously extrude glass shapes, including other than circular shapes, which retain their orifice configuration with virtually no attenuation.

A still further object of the invention has been to provide a method and apparatus for melting glass stock and directly conditioning it to its working temperature for producing finished articles therefrom without necessitating a conventional high temperature refining process.

A still further object of the invention has been to continuously extrude glass articles with a low attenuation ratio by utilizing high viscosity glasses at high extrusion pressures.

These and other objects of the invention will become more apparent to those skilled in the art from the accompanying specification and drawings in which:

FIGURE 1 is a loading end view of apparatus embodying the invention.

FIGURE 2 is a cross-sectional view taken along line II—II of FIGURE 1.

FIGURE 3 is a cross-sectional view taken along line III—III of FIGURE 1.

FIGURE 4 is a cross-sectional view taken along line IV—IV of FIGURE 2.

FIGURE 5 is a cross-sectional view taken along line V—V of FIGURE 2.

Referring now to the drawings, and particularly FIGURE 2, an extrusion furnace 10 is shown having a central melting tube 11 forming an elongated melting chamber 12. The tube 11 may be provided with a ring flange 13 adjacent the loading or inlet end of the furnace 10, and a positioning flange 14 adjacent the extrusion end, which is held in place by an orifice ring 15. The melting tube 11 and orifice ring 15 may be made of any suitable material such as platinum, platinum clad metal, or stainless steel, so long as it is compatible with the composition of the glass being melted.

The melting tube 11 is wound or backed by resistance heating elements 16, 16' which may be embedded within a refractory material 17 immediately adjacent the external periphery of the tube. An insulating material 18, such as a castable alumina refractory surrounds the refractory material 17 and is bounded by a steel shell 19, which provides much of the strength required for the structural stability necessary at high pressures. A layer of flow conductivity insulation 20 such as standard insulating brick is provided about the structural steel shell 19 and is enclosed within a thin steel outer casing 21. As shown particularly in FIGURE 1, the outer casing is formed from two identical half sections 21a, 21b which are provided with mating flanges 22. The identical half sections 21a and 21b are bolted together by nut and bolt means 23 along the flange portions 22 by means of spacer or support blocks 24.

Cane or rod 25 is continuously fed into the loading end of melting tube 11 by any suitable means such as tandem-operated pushing cylinder means wherein a pushrod of one cylinder engages the cane and moves it along a length of such rod and then disengages. At that time the pushrod of a second cylinder engages the rod to move it along its length, while the first rod simultaneously retracts to repeat its operation. Alternately, suitable ribbed friction-gripping flexible feed belts 26, driven by pulleys 26', may be utilized to continuously feed rod or cane 25 into the melting tube 11 at a constant rate and/or force. Predetermined lengths of cane 25 are fusion-sealed together to form a continuous length of feed cane and prevent the entrapment or blisters within the body of the glass. A slight clearance is provided between the rod or feed cane 25 and the inner periphery of melting tube 11, so as to facilitate the entrance of the cane within the tube. As the cane 25 moves forwardly within the tube, the resistance heating elements 16 melt the cane during its forward travel within the tube, at a location depending upon the feed rate of the cane and temperature applied by the heating elements, thus causing the cane to bellow or flow outwardly and fill the tube 11 forwardly thereof with molten viscous glass 27.

A skimmer ring 28 is positioned about the melting tube 11 forwardly of the point where the rod 25 is fused into molten glass 27. The skimmer ring 28 is preferably made of platinum, but may be of any other suitable compatible metal, and has two rows of holes or openings 29 extending around the surface of the melting tube 11. The holes 29 are preferably in a longitudinally overlapping arrangement so as to ensure the complete skimming of the entire surface of the molten glass 27 passing through the melting tube 11. A platinum discharge tube 30 communicates with the ring 28 to lead off the skimmed glass. The tube 30 is provided with a plurality of resistance windings 31 to control the temperature of the glass passing through the tube and accordingly adjust its viscosity or impedance. Hence, it is possible to control the amount or percentage of surface glass skimmed from the molten glass 27 by adjusting the temperature imparted by the windings 31 to the glass in tube 30.

Since the molten glass 27 is under high pressures, the surface thereof has a tendency to ooze out through the holes 29 in the skimmer ring 28 as the glass is urged forwardly through the tube 11. However, the amount of surface glass extracted is dependent upon the temperature of the glass within discharge tube 30. That is, when the glass within tube 30 is allowed to cool and solidify, no further skimming effect will be achieved, whereas when such glass is heated to such a temperature so as to produce a viscosity less than that within tube 11, a greater portion of the surface glass will be skimmed. Therefore, the impedance of the stripping or discharge passage 30 is thermally controlled so as to strip-off the desired fraction of the molten glass within the tube 11. When the nature of the glass composition so requires, approximately 10–20% of the incoming glass may be stripped to produce a glass product having a literally seed-free consistency, although some glass compositions do not require any stripping whatsoever to produce such a final product.

The resistance heater 16', surrounding the tube 11 between the skimming ring 28 and orifice ring 15, functions to provide the skimmed glass with a uniform cross-sectional temperature as the glass is presented to the orifice ring for extrusion. The orifice ring 15 is readily removable, such as by nut and bolt means 32, so that a plurality of orifice rings having various orifice configurations may be readily interchanged with the operating orifice and thereby provide extruded articles having a variety of cross-sectional configurations.

A temperature control muffle 33 is preferably provided exteriorly of the orifice ring 15 so as to maintain the orifice at a constant desired temperature, and prevent the extruded product from cooling too rapidly. The muffle 33 is provided with an outer shell 34 secured to a backing plate 35 for attachment to the furnace 10 by nut and bolt means 32. An electric resistance winding 36 is provided within the muffle 33 and backed by suitable insulation 37 such as an aluminum silicate fiber glass.

Although the finished product extruded through the orifice 15 may be attenuated if desired, by withdrawing it from the orifice at a higher rate than it normally would pass therethrough under the pressure exerted by the incoming cane 25, one of the advantages derived by the present invention is the fact that due to the high pressure generated within the melting chamber, articles may be extruded with little or no attenuation thus maintaining close tolerances with dimensional accuracy. The pressure generated within the melting furnace is produced by the force of the incoming cane, for instance, a 200 pound force on a ¾ inch diameter cane will produce a pressure of approximately 500 pounds per square inch at the orifice. In a normal tube draw, such as the Vello process, a pressure of approximately 1 pound per square inch is exerted at the orifice.

Although the pressure of the incoming cane, inserted in the loading end of the melting tube 11, produces the high extrusion pressures at the orifice, it has been found that a mechanical seal adjacent the loading end of the tube is unnecessary, since the molten glass adjacent the incoming rod makes its own seal at approximately the point where the rod becomes molten. That is, with a tubular inlet radius R and an orifice opening having a longitudinal length $l$ and a radius $r$, the distance $x$ that molten glass will flow backwardly along the incoming cane from the melting point is set forth in the following relationship $$\frac{x}{l} = \left(\frac{R}{r}\right)^4 \times K$$

wherein K is a determinable constant depending upon the radius of the cane fed into the inlet tube 11, as set forth in the following formula:

$$K = \alpha^2 (1-\alpha^2)^2 \left[ \frac{\frac{1+\alpha^2}{1-\alpha^2} - \frac{1}{\log_e 1/\alpha}}{\frac{1-\alpha^2}{\log_e 1/\alpha^2} - \alpha^2} \right]$$

wherein $\alpha R$ equal the radius of the incoming cane.

That is, the distance $x$ is determined by the relative dimensions of the entrance annular opening and of the extrusion orifice opening, and the effect of viscosity and glass pressure are virtually negligible with respect to the distance $x$. It is theorized that the backward flow of the molten glass remains in a molten or semi-viscous state and does not become solid, since if it did solidify it would weld to the rod and prevent the rod from being forced into the melting chamber.

The temperature maintained in the melting tube will of course be dependent upon the glass composition utilized. The important feature is that the temperature of the glass within the tube be at a value which produces the proper viscosity required at the orifice to provide the minimum attenuation. For instance, the viscosity may be between 100,000 and 500,000 poises if desired.

The temperature maintained within the chamber 12 affects melting rate of the glass, and accordingly the flow through the orifice 15. That is, as the temperature increases, melting rate and fluidity increase, and accordingly the flow through the orifice increases; whereas when the temperature decreases melting rate and fluidity decrease and accordingly flow through the orifice decreases.

The flow through the orifice is, of course, a function of the temperature of the glass at the orifice. If the cane is fed at a constant linear rate, and the temperature of the melting chamber held constant, the pressure within the furnace will so regulate itself that the product will extrude through the orifice at a constant rate. In other words, the volume of cane coming into the entrance end of tube 11 will equal the volume of the molten glass extruded outwardly through the orifice. If the pressure on the cane is increased, and temperature held constant, the flow through the orifice will increase; whereas a decrease in cane pressure, with constant temperature, will result in a decrease flow through the orifice.

Predetermined lengths of cane are preferably first sealed together at their ends, such as by fusion, so as to prevent the entrapment of blisters within the body of the glass. The cane is forced into the melting tube 11 of the furnace 10 at a constant linear rate or predetermined force. As the cane proceeds into the unit, it is slowly heated by the resistance windings 16 in the melting zone above its softening point to a suitable melting temperature, which is preferably above its liquidus point. As the cane reaches such temperature along its travel within tube 11, it softens and bellows outwardly to fill the complete cross-sectional area of the tube from that point forward and exerts pressure on the molten portion.

Any tendency of the molten portion to backflow within the tube 11 along the solid incoming cane is inhibited by the inward motion of the incoming cane, and the molten glass tends to make its own seal with the incoming glass at approximately the point where it becomes molten. Further, the clearance between the cane and the tube walls is so small, and the fact that the cane is cold and moving longitudinally, prevents the molten glass from being extruded outwardly through the inlet opening.

Small blisters or seeds which may generate on the surface of the cane, adjacent the inner surface of the tube, are drained or skimmed off at the skimming ring, which is a short distance past the point where the glass becomes molten. Since the stripping operation is not required on all glasses and the degree of stripping varies with the glass composition, the impedance of the stripping passage is thermally controlled so as to strip-off the desired fraction or percentage of the molten glass body passing through the furnace tube. A constant force is maintained on the cane, and the resistance windings about the tube are regulated to maintain the stripped molten glass within the tube at a predetermined working temperature, preferably above the liquidus of the glass, so as to provide a desired output flow. Further, a high quality glass is obtained at the orifice without having to subject the glass within the tube to conventional high refining temperatures. Preferably the extruded article is withdrawn from the orifice area at its rate of formation, so that attenuation is minimized or eliminated.

Although the temperatures and pressures utilized may vary with different glass compositions and diameters of cane utilized in different melting tubes, the following specific example, which is by no means limiting, illustrates one working set of parameters. Utilizing a furnace having a platinum melting tube approximately 20 inches long and ⅞ inch internal diameter with an orifice opening of ½ inch diameter, four-foot lengths of ¾ inch cane were fusion-sealed together at their ends and introduced into the loading end of the melting tube at a rate of 1¾ pounds per hour. The force on the incoming cane was 200 pounds, producing a pressure at the orifice of approximately 500 p.s.i. The temperature of the glass in the melting zone was approximately 1,050° C. and the temperature at the orifice approximately 900° C. with a viscosity at the orifice of approximately 300,000 poises. The temperature of the skimmer ring discharge tube was maintained at approximately 800° C. to control the impedance therealong and produce a desired skimming rate of about 10% by volume of the glass introduced into the melting tube. The temperature at the skimmer ring was approximately 1,000° C., and the glass emanating from the orifice as ½ inch diameter cane without attenuation was essentially seed-free and of very high quality.

Due to the high viscosity utilized in producing the extruded ware with little or no attenuation, the furnace may be run horizontally, vertically, or in any desired angle with respect to the horizontal. Further, since the melted glass is not subjected to air inclusion, the glass may be brought up to its melting temperature and maintained at a desired working temperature as it is passed directly through the orifice to form a finished article of high glass quality. With known tube drawing processes, it has been necessary to heat the glass up to extremely high fining temperatures, and hold it there for a period of time, before bringing it back down to that temperature at which it is to be utilized, in order to obtain acceptable glass quality. Further, with the present invention, it is possible to reduce the attenuation ratio by utilizing high pressures and high viscosities, thus producing accurately controlled end products having intricate cross-sectional configurations with dimensional uniformity along their longitudinal extent.

I claim:
1. A method of continuously forming extruded glass articles having improved dimensional uniformity which comprises, continuously injecting cane into one end of a melting chamber, maintaining a constant predetermined force on said cane being introduced into said chamber, melting an inner end portion of said cane as it is advanced forwardly within said chamber to form molten glass, subjecting said molten glass within said chamber to high extrusion pressures created substantially entirely by the force applied to said cane, continuously extruding the molten glass through an orifice at the opposite end of said melting chamber responsive to the force applied to said cane to form glass articles having improved dimensional uniformity, and removing a predetermined surface portion of the molten glass passing through the chamber to produce glass having a virtually seed-free consistency.

2. A method as defined in claim 1 wherein the cane is initially heated to a desired melting temperature and conditioned to a working temperature above its softening point but considerably below its normal fining temperature, and maintaining the molten glass substantially at such working temperature for delivery to the extrusion orifice.

3. A method as defined in claim 1 wherein the molten material is extruded through the orifice end of the melting chamber and withdrawn therefrom with an attenuation ratio of approximately 1.

4. A method of continuously extrusion-forming glass articles having improved cross-sectional uniformity and dimensional accuracy which comprises, continuously inserting cane into the loading end of a melting chamber, heating such chamber to melt the inner end of said cane as it moves forwardly through said chamber thus causing a backflowing of a portion of the melted glass to form a seal for the loading end of said chamber and prevent the extrusion of molten glass therefrom, urging said cane into said chamber with a constant predetermined force thus creating a high extrusion pressure at an outlet end of said chamber in response to said force, and extruding said molten material through an outlet orifice under pressure generated by the force of the incoming cane and at an extrusion rate equivalent to the rate of insertion of said cane into said melting chamber.

5. A method as defined in claim 4 including the step of stripping a predetermined surface portion of the molten glass passing through the melting chamber to provide substantially blister-free glass at the orifice.

6. A method as defined in claim 4 wherein the pressure exerted on the molten glass by the incoming cane and the viscosity of the molten glass as controlled by the temperature are maintained sufficiently high so as to extrude a finished article with an attenuation ratio of approximately 1.

7. Apparatus for extrusion-forming glass articles from high viscosity glass and under high pressures so as to eliminate attenuation and produce articles having improved dimensional accuracy and uniform cross section which comprises, a melting chamber having a loading inlet end and an extrusion outlet end, means for forcing glass stock into said loading end with a constant predetermined force, means for heating the glass stock above its softening point while in said chamber to form molten glass material, means defining an extrusion orifice adjacent the extrusion outlet end of said chamber, means for removing a surface portion of the molten glass passing through said melting chamber including an annular ring surrounding said melting chamber and having a plurality of hole portions communicating with the inner periphery thereof, and a discharge tube communicating with said annular ring.

8. Apparatus as defined in claim 14 wherein said discharge tube is provided with variably-controlled heating means so as to control the impedance of the stripped molten glass passing therethrough and thereby strip-off a desired fraction of the molten glass within the melting chamber.

References Cited

UNITED STATES PATENTS

| 1,657,442 | 1/1928 | Miller | 65—183 |
| 2,771,634 | 11/1956 | Luzzatto | 18—8 |
| 3,328,144 | 6/1967 | Glaser | 65—11 |

S. LEON BASHORE, Primary Examiner

J. H. HARMAN, Assistant Examiner

U.S. Cl. X.R.

18—5; 65—65, 136; 264—176

UNITED STATES PATENT OFFICE
CERTIFICATE OF CORRECTION

Patent No. 3,467,513                                                September 16, 1969

Stuart M. Dockerty

It is certified that error appears in the above identified patent and that said Letters Patent are hereby corrected as shown below:

Column 2, line 44, "flow" should read -- low --. Column 6, line 34, "thus" should be cancelled; line 71, the claim reference numeral "14" should read -- 7 --.

Signed and sealed this 23rd day of December 1969.

(SEAL)
Attest:

EDWARD M. FLETCHER, JR.                            WILLIAM E. SCHUYLER, JR.
Attesting Officer                                               Commissioner of Patents